United States Patent [19]

Miyazaki et al.

[11] Patent Number: 5,740,484
[45] Date of Patent: Apr. 14, 1998

[54] CAMERA CAPABLE OF RECORDING DATA ONTO FILM

[75] Inventors: Satoshi Miyazaki, Tokyo; Minoru Matsuzaki; Yasuo Asakura, both of Hachioji; Akira Watanabe, Fuchu, all of Japan

[73] Assignee: Olympus Optical Co., Ltd., Tokyo, Japan

[21] Appl. No.: 651,425

[22] Filed: May 22, 1996

[30] Foreign Application Priority Data

Jun. 1, 1995 [JP] Japan ................. 7-134879

[51] Int. Cl.$^6$ ..................................... G03B 17/24
[52] U.S. Cl. ........................................... 396/319
[58] Field of Search ........................ 354/105, 106; 396/310, 311, 319

[56] References Cited

U.S. PATENT DOCUMENTS

| | | | |
|---|---|---|---|
| 4,977,419 | 12/1990 | Wash et al. | 354/76 |
| 5,194,892 | 3/1993 | Robison | 355/40 |
| 5,251,840 | 10/1993 | Niedospial | 242/71.1 |
| 5,287,136 | 2/1994 | Kitagawa et al. | 354/173.1 |
| 5,313,236 | 5/1994 | Izukawa | 354/106 |
| 5,335,029 | 8/1994 | Itoh et al. | 354/106 |
| 5,416,546 | 5/1995 | Izukawa | 354/106 |
| 5,450,149 | 9/1995 | Cocca | 354/106 |
| 5,475,455 | 12/1995 | Hibino et al. | 354/106 |
| 5,477,289 | 12/1995 | Smart | 354/106 |
| 5,479,226 | 12/1995 | Kazami et al. | 354/21 |
| 5,485,233 | 1/1996 | Yokonuma et al. | 354/106 |
| 5,530,501 | 6/1996 | Bell | 354/106 |
| 5,546,145 | 8/1996 | Bernardi et al. | 354/76 |

FOREIGN PATENT DOCUMENTS 5-45801  2/1993  Japan .

OTHER PUBLICATIONS

Digital Design Principles and Practices by John F. Wakerly pp. 14–16, 55, 225–227, 1990.

Primary Examiner—Safet Metjahic
Assistant Examiner—Christopher E. Mahoney
Attorney, Agent, or Firm—Kenyon & Kenyon

[57] ABSTRACT

A camera capable of recording information uses a film cartridge that includes a spool for rolling a film that includes a data recording portion. A pair of elastic flanges having annular lips peripheries thereon are provided on the spool for nipping successive convolution of the film. The film is propelled out of the cartridge by rotating the spool in a predetermined direction. The camera further comprises a feeding member for winding the film fully when the cartridge is loaded into the camera and rewinding the film into the cartridge in response to the completion of a film exposure. A recording means is also provided in the camera. The rewinding means serially records the information onto the recording portion of the film when the film is rewinding.

21 Claims, 7 Drawing Sheets

CAMERA CAPABLE OF RECORDING DATA ONTO FILM

BACKGROUND OF THE INVENTION

1. Field of the Invention

The present invention relates generally to a camera, and more particularly to a camera capable of recording information onto a film rolled in a cartridge including a spool shaft having a pair of elastic flanges provided at both end portions thereon, the flanges having respective annular lips along their circumferential edges for wrapping successive convolutions of the film roll tightly and propelling an outermost convolution of the film roll out of the cartridge.

2. Description of the Related Art

U.S. Pat. No. 5,251,840 and Japanese Unexamined Patent Publication hei 5-45801 disclose a film cartridge including a spool shaft having a pair of elastic flanges provided at both end portions thereon, the flanges respectively having annular lips along their circumferential edges for wrapping successive convolutions of the film roll tightly and propelling an outermost convolution of the film roll out of the cartridge. The annular lips are deformed by the film wrapped therebetween at a film passageway of the cartridge in order to propel the film therefrom.

FIG. 7 illustrates a film 102 rolled on a spool shaft 103 of a cartridge 101 that is loaded in a camera. A pair of flanges 105 and 106, made of an elastic material, are provided on both end portions of the spool shaft 103, the flanges 105 and 106 respectively having annular lips 105a and 106a along their periphery. As the film 102 is propelled from the cartridge 101 and passes through the rear space of an exposure aperture of the camera, the film 102 is rolled around a take-up spool 107. Portions 105b and 106b of the flanges, which are disposed near film passageway 104, are elastically deformed by the film 102. The film 102 has a series of perforations disposed along a longitudinal edge thereof.

FIG. 8 illustrates a lateral cross-section of the film. FIG. 8(a) shows a typical curling state of the film 102, and FIG. 8(b) shows an example of a curling state of the film after releasing deforming force F-F', which had been applied to the film 102 for a long time. In FIG. 8(a), the film 102 naturally tends to curl towards the emulsion side 102(b). The natural curling amount C1 is limited within a predetermined range.

FIG. 9 illustrates a cross-section of the film 102 along line A-A' of FIG. 7. FIG. 9(a) shows a typical curling state of the film 102, and FIG. 9(b) shows an example of a curling state of the film after one frame of the film has been wound, in which deforming force F-F' is applied for a long time. The cross-section of FIG. 9 corresponds to a portion of the film where the deforming force is applied for a long time by the lips, and located at the exposure aperture 108 in response to winding one frame of the film.

In FIG. 9(a), a pair of film rails 109(a) and a pair of pressure-plate rails 109(b) are provided adjacent to the exposure apeme 108 of the camera body 109, and a pressure-plate 110 contacts the pressure-plate rails 109(b). Typically, the portion of the film 102 that is positioned at the exposure aperture is held within a substantially plane surface by the pressure-plate 110. Even if the film surface is partially spaced from the pressure-plate 110 due to dispersion of the film or environmental conditions, the spacing amount Z1 will be in the range of 0–0.02 mm.

In the above-mentioned film cartridge, however, some curling will occur on the film as a result of the deforming force F-F' being applied near the passageway 104 as shown in FIG. 7. The portion of the film 102 to which the deforming force F-F' is applied has a rather large amount of curling C2, which exceeds C1, so that the portion of the film will be bent ahead with spacing amount Z2.

For instance, if the deforming force F-F' is set about 30 g, and it is continuously applied for twenty four hours, then a spacing amount Z2 in the range of 0.03–0.10 mm. will result at center of exposure of a frame. Therefore, the camera will become out of focus at the center of the frame.

SUMMARY OF THE INVENTION

The first object of the present invention is to provide a camera capable of recording data onto a film rolled in a cartridge which propels the film out of the cartridge.

In order to achieve the above-described object, a camera capable of recording data according to an embodiment of the present invention includes feed means for initially winding the film without exposure when the cartridge is loaded into the camera and for rewinding the film after shooting a frame of the film. The camera of the present invention also includes recording means for recording data onto the film, and control means for regulating the writing order of the recording data in response to the initial winding or the rewinding after exposure, wherein data is recorded on a leader portion, a trailer portion or a recording portion on each frame of the film.

These and other advantages and features of the present invention will become readily apparent to those skilled in the art after reading the following detailed description of the invention and studying accompanying drawings.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENTS

The preferred embodiments of the present invention will be described below with reference to the drawings annexed hereto.

Figure 1:
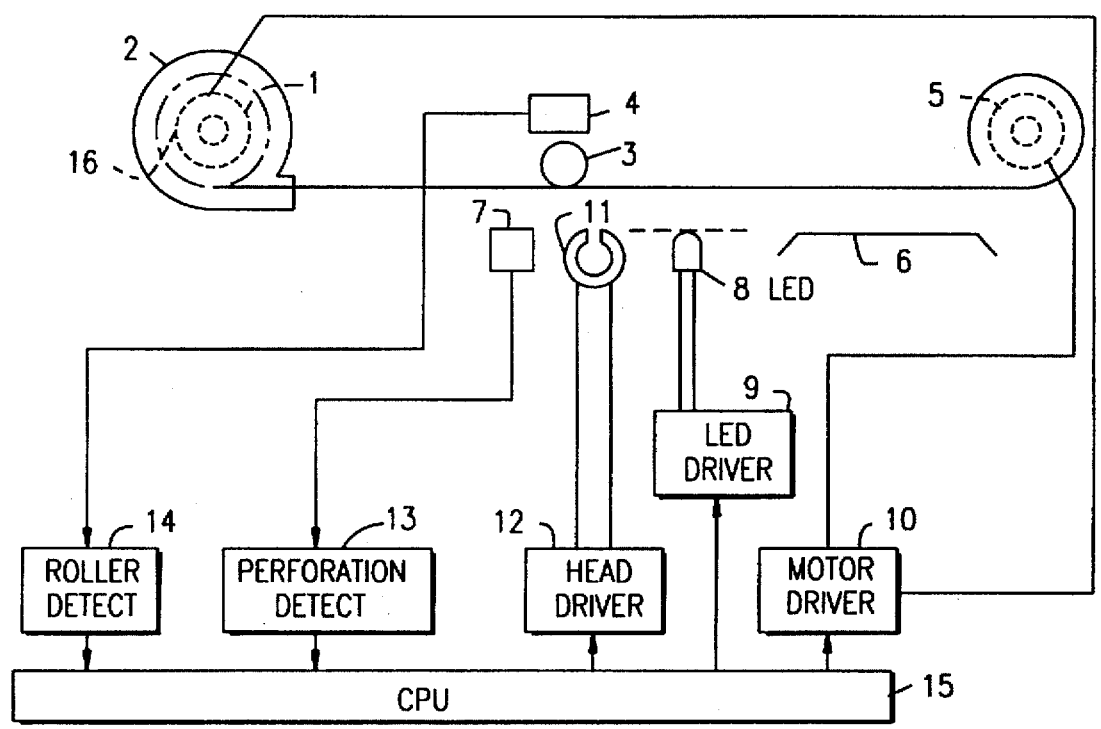
FIG. 1 illustrates a structure according to an embodiment of the present invention.

FIG. 1 illustrates a camera according to an embodiment of the present invention. A magnetic recording track (not shown) is provided on a film 1. The recording track is capable of recording various photographic information as magnetic data. The film 1 is rolled on a cartridge spool 16 provided in a film cartridge 2. The cartridge 2 can wind or unwind film by rotating the spool 16. The spool 16 has an engaging groove for engaging a driving fork (not shown). A motor (not shown) controls the rotation of the spool 16 by rotating the driving fork via a driving gear train (not shown).

The motor is driven by a driver circuit 10, and the direction of rotation and the driving voltage for the driver circuit is set by a CPU (Central Processing Unit) 15.

The motor is also utilized for driving a take-up spool 5. The film 1 is taken up by the take-up spool 5 after being propelled from the cartridge 2. There are provided between the cartridge 2 and the film take-up spool 5, a pressure plate 6 for ensuring the flatness of the film 1, a sensor 7 for detecting the perforations of the film 1, a follower roller 3 for detecting advance amount of the film 1, a magnetic recording head 11 for recording magnetic data onto the magnetic recording track of the film 1, and a LED (Light Emitting Diode) 8 for recording data optically.

A sensor 4 for detecting a rotation amount of the film follower roller 3 is provided near the film follower roller 3. An output signal of the sensor 7 is supplied to the CPU 15 after wave-form shaping is performed on the data by a perforation detecting circuit 13.

The CPU comprises a micro processor utilized for controlling whole functional blocks of the camera. For example, the CPU 15 calculates the position of the film 1 on the basis of the output of the sensors 4 and 7, and the CPU 15 controls the driving circuit 10 to cause the motor to feed film 1. Data recording is performed magnetically by the magnetic head 11 during the feeding of the film. Another way of recording data is achieved by flashing the LED (Light Emitting Diode) 8 to write optical data onto an optical recording portion of the film. Other operations such as light metering, film exposing, range finding, and detection of operation switches (not shown) are also controlled by the CPU 15.

Figure 2:
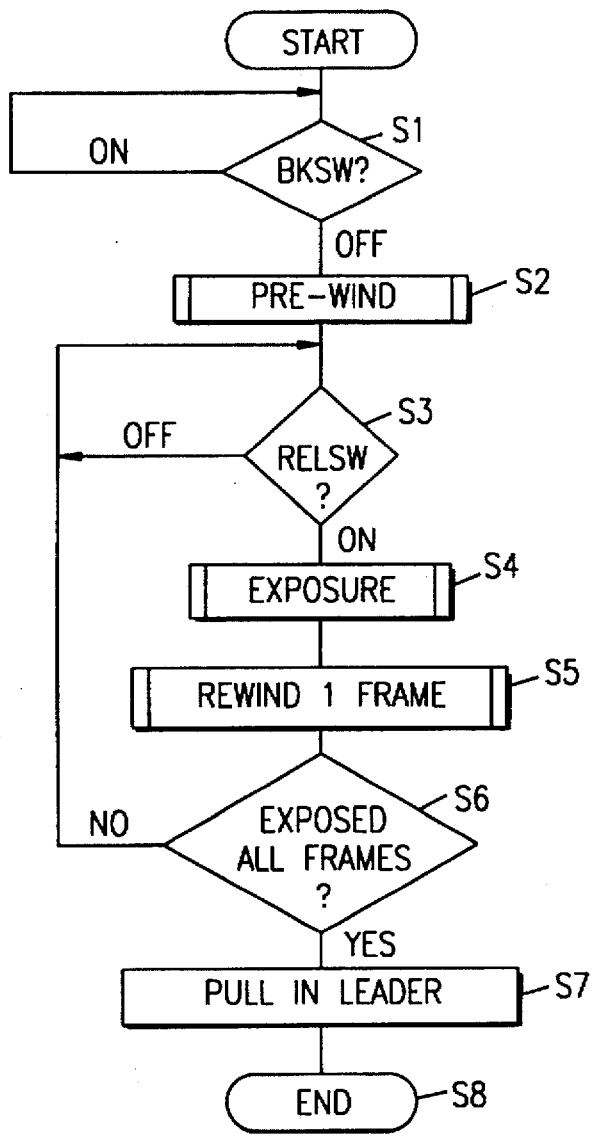
FIG. 2 illustrates a generalized operating sequence of the CPU 15.

FIG. 2 illustrates a generalized operating sequence of the CPU 15. In step S1, the the CPU 15 senses BKSW, which turns off when the cover of the camera loading chamber is closed after the film cartridge 2 is loaded into the loading chamber.

On detecting the transition of BKSW from ON to OFF, the CPU 15 at step S2 operates to wind all frames of the film 1 to the take-up spool 5 without exposing any of the film. The camera of this embodiment is referred to as a pre-winding camera, which is ready for shooting after the completion of the pre-winding operation.

Figure 3:
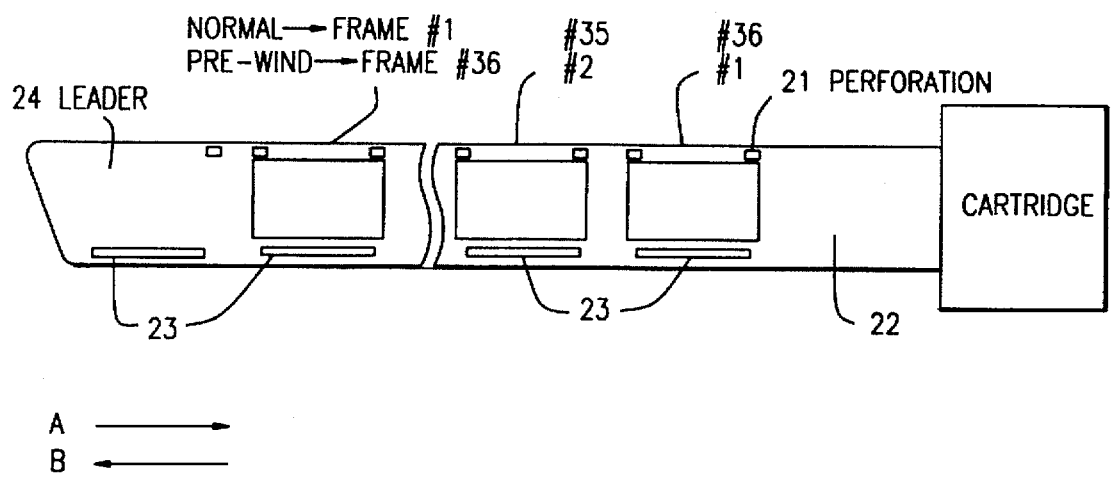
FIG. 3 illustrates a magnetic data recording track provided in each frame of the film.

The recording tracks of film 1 are provided in every frame, as shown in FIG. 3. At a film processing laboratory, information such as a user ID or a film ID are recorded on a leader portion of the film 1. The user ID or the film ID may be recorded optically.

In general, when a camera other than the pre-wind type is used, the film 1 is fed from the cartridge to the take-up spool one frame following every shoot, so that the magnetic data is recorded along the direction A of FIG. 3, which requires the data reading direction to be set in the same direction A. However, the camera of this embodiment records data along direction B of FIG. 3, which causes the data reading direction to be set in the direction B, so that specific information indicating a pre-winding camera type should be recorded in the leader portion of the film along the direction A when executing the pre-winding operation. Thus, the recording direction of each frame can be determined by reading data recorded in the leader portion of the film. The determination of data recording direction also can be made by using optically recorded information.

Returning to FIG. 2, in step S3, the CPU 15 senses RELSW (release button). On detecting the ON state of the RELSW, the camera executes range finding, light metering, and exposure operations in step S4. In step S5, the exposed frame is rewound into the cartridge 2. At this point, the CPU 15 records data in response to output signals from the sensors 4 and 7. Such data may include a frame number, a shooting date, scene brightness, or trimming print information, etc.

In Step S6, the CPU 15 judges if the first frame (#1) of the film (last frame in this case) has been exposed. On determining that all frames of the film have been exposed, the camera continues film rewinding to pull in the leader portion of the film in step S7, and ends operation in step S8. In step S6, if all the frames of the film have not been exposed yet, the flow diagram returns to step S3 and begins waiting for the next shooting.

Figure 4:
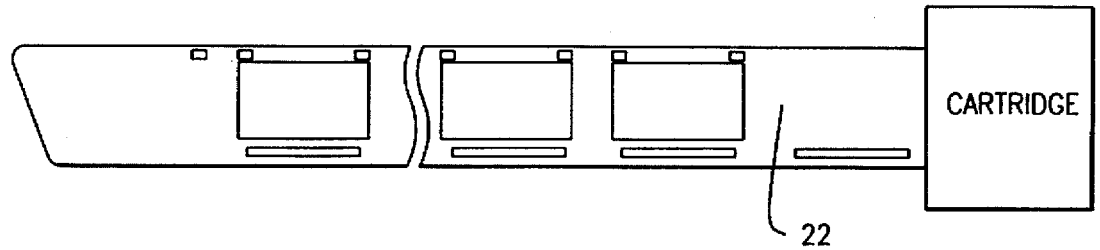
FIGS. 4 through 6 show data recording area according to modified embodiments.

Another embodiment of the present invention will be described below in relation to FIG. 4. In the camera of the previous embodiment, the specific information indicating usage of the pre-winding camera is recorded in the leader portion 24 of the film; however, the information is also allowed to be recorded in trailer portion 22 of the film, as shown in FIG. 4. In such a case, the information is recorded when executing pre-winding in step 2 of FIG. 2. Determination of film exposure and whether a pre-wind camera is used can be made by reading the information recorded in the trailer portion of the film. The information relating to the film advance direction can be recorded in the leader portion, and information other than film advance direction can be recorded in the trailer portion of the film.

Figure 5:
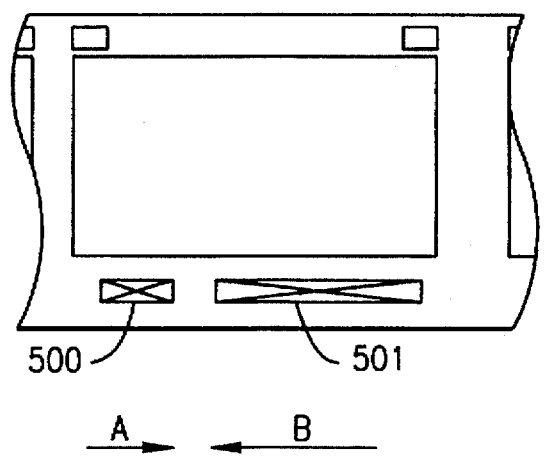
Figure 6:
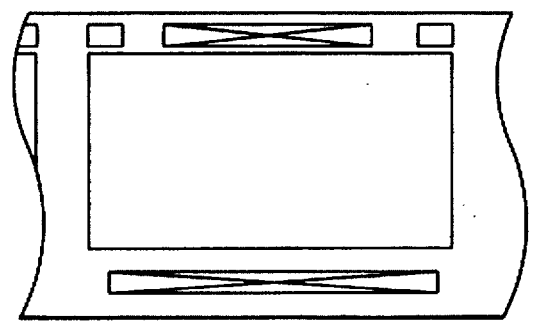
Figure 7:
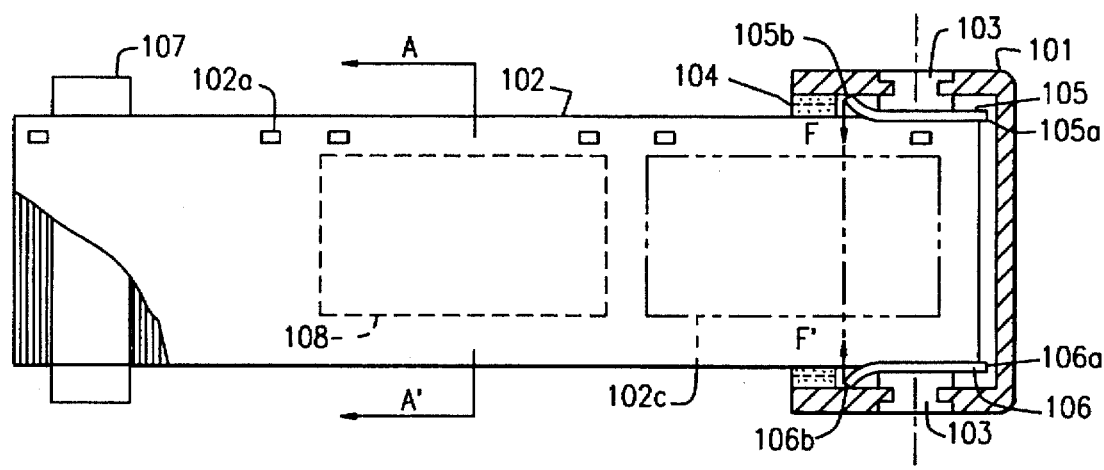
FIG. 7 illustrates a film 102 rolled on the spool shaft 103 of the cartridge 101 loaded in a camera.
Figures 8A, 8B:
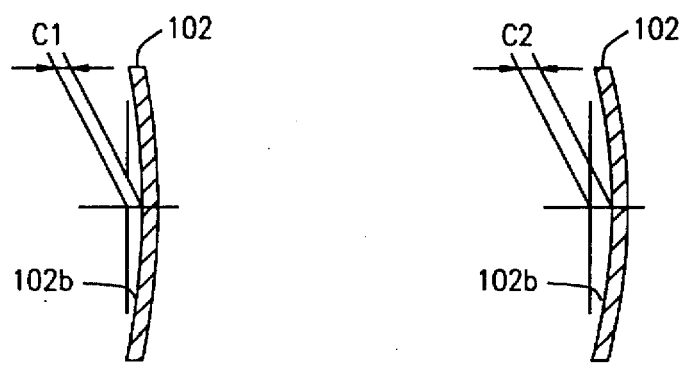
FIG. 8(a) illustrates a typical curling state of the film 102.
FIG. 8(b) shows an example of a curling state of the film after releasing deforming force F-F' after it has been applied to the film 102 for a long time.
Figure 9A:
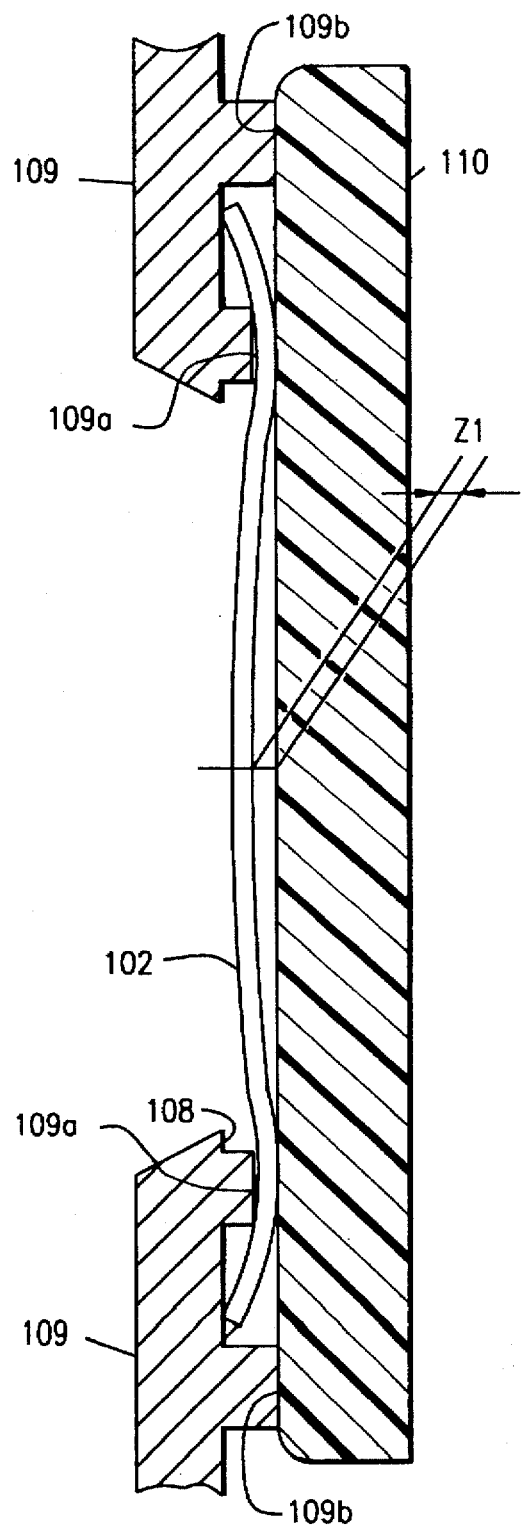
FIG. 9 (a) illustrates a cross-section along line A-A' of FIG. 7 showing a typical curling state of the film 102.
FIG. 9(b) illustrates an example of curling state of the film after winding the film one frame where deforming force F-F' applied as the camera has been left alone for a long time.
Figure 9B:
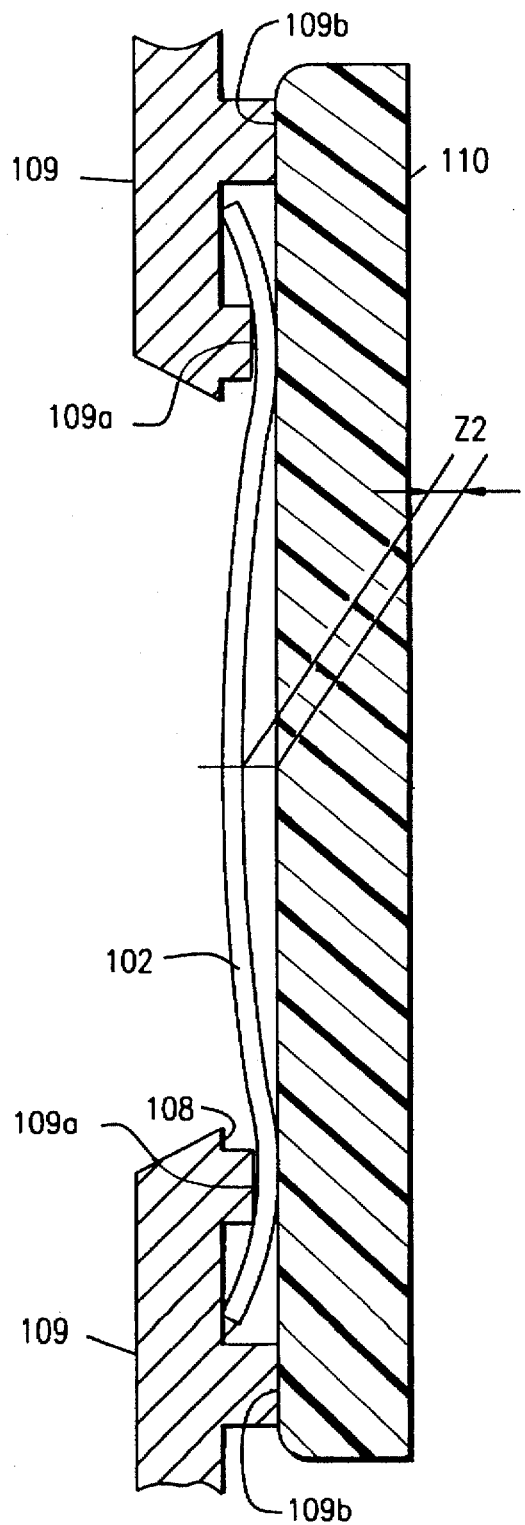
Figure 10:
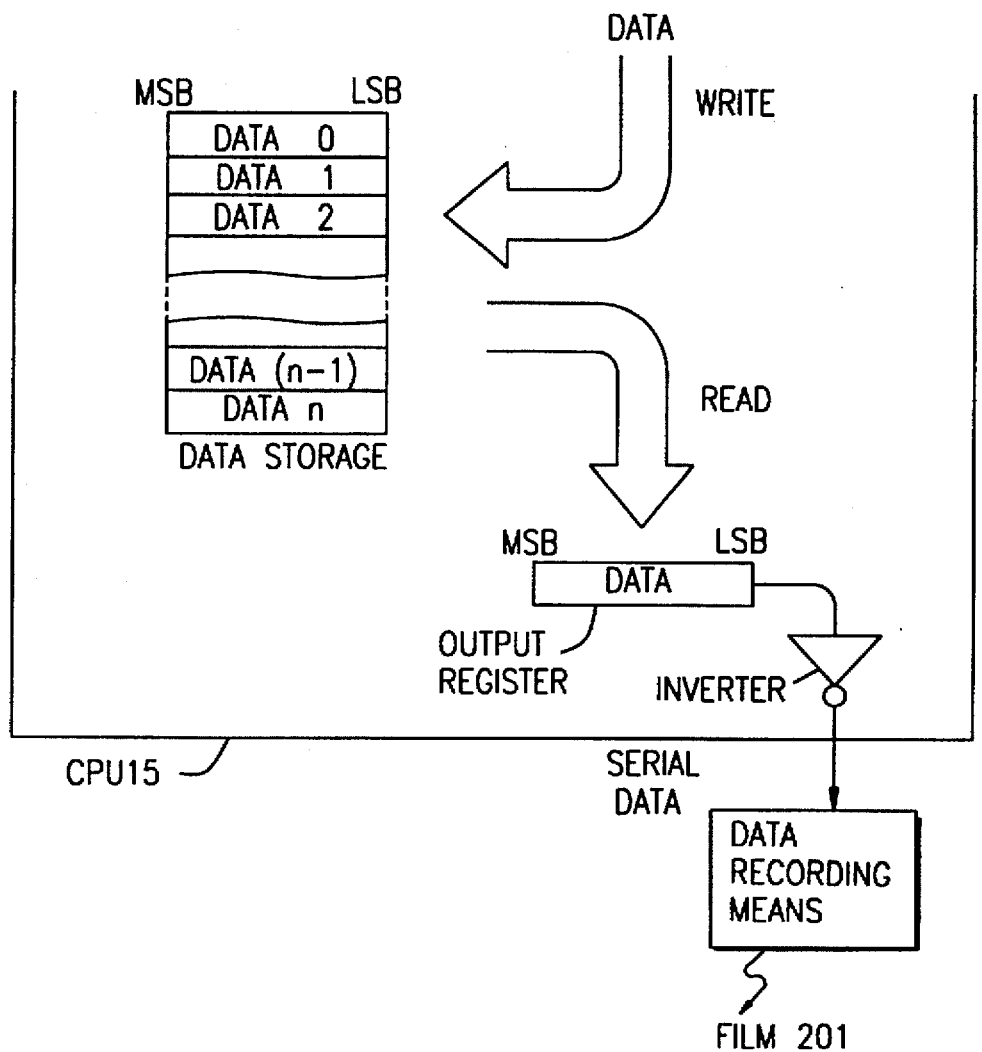
FIG. 10 illustrates flow diagram showing the recording of data onto a film.

The recording tracks of each frame of the film can be divided into two parts, 500 and 501, as shown in FIG. 5. Information relating to pre-winding can be recorded in the track 500 along direction A, and information from each shooting can be recorded in the track 501 along direction B. In such a case, the information relating to pre-winding is recorded in each track 500 of a frame while pre-winding, and all shooting information is recorded in each track 501 while one frame is rewinding after shooting. An alternative way is available such that the recording tracks are divided into two parts, one is located above the frame, and the other below the frame.

Still another embodiment of the present invention will be described below. The previous embodiments require some specific function for adapting reverse direction of recording in an equipment of the film processing laboratory; however, in this embodiment, no such functions are required despite the use of a pre-winding camera.

A camera of this embodiment has a structure similar to that of FIG. 1; however, in this embodiment, the CPU 15 inverts the data by inverting the value of the bits in the data. This technique is also referred to as deriving 1's complement of the data. After inverting the data, the CPU 15 also outputs serial data according to a first procedure in which CPU 15 reads out parallel data from the least significant bit (LSB) to the most significant bit (MSB). This procedure is performed when serial recording data is transmitted to the data recording means, which may comprise the LED controller circuit 9 or the magnetic data writing circuit 12. Accordingly, data recording is executed on rewinding after exposure, as in step S5 of FIG. 2.

The reason for inverting all the data will be described below. That is, magnetic recording onto the film is achieved by pulse position modulation (PPM), which denotes binary information by a pulse transition timing within a bit cell, so that simply inverting the data writing direction causes an inversion of read out data. This drawback is prevented by inverting the binary value of all recording data.

In the above description, the recording data is inverted after being transformed into the serial data format; however, an alternate procedure can be given such that the CPU 15 transforms the parallel data read out of the memory into its 1's complement and outputs the transformed data in the serial data format when reading out data to record.

In case of recording data on the film initial winding, the CPU 15 outputs the MSB data first, and reads out parallel data from its most significant bit (MSB) to its least significant bit (LSB).

The data recorded by using the above described procedure is substantially equivalent to that of data recorded by a camera that does not use the pre-winding procedure. Thus, the equipment in the film processing laboratory can read data on the film regardless if the camera uses a pre-winding procedure, so that information indicating direction of the recorded data is not required any more, and all of the data recording tracks can be fully used.

As described above, in order to prevent loose focusing due to deformation of the film at the exposure aperture, the camera of the present invention assures substantial flatness of the film by utilizing the film pre-winding procedure.

Furthermore, the camera of the present invention provides data recording tracks on the film in which data are recorded in the alternate direction, so that data recording has no disadvantages.

The invention has been described with reference to a preferred embodiment. However, it will be appreciated that variations and modifications can be effected within the ordinary skill in the art without departing from the scope of the invention.

What is claimed is:

1. A camera capable of using a film cartridge including a film having a plurality of magnetic recording tracks, the film being rolled on a spool shaft having a pair of end portions, each end portion of the spool shaft including an elastic flange, the film being propelled out of the cartridge by rotating the spool shaft in a predetermined direction, comprising:

feed means for fully winding the film initially without causing exposure of the film on loading the cartridge into the camera and rewinding the film after shooting a frame of the film;

inverting means for inverting data after the film is exposed;

writing means for writing data onto at least one of the plurality of magnetic recording tracks of the film in a winding direction and a rewinding direction, wherein the writing means writes the inverted data into at least one of the plurality of magnetic tracks in the rewinding direction; and control means for controlling the feed means, the inverting means, and the writing means.

2. The camera according to claim 1, wherein the data is written from its most significant bit to its least significant bit during the initial winding of the film, and wherein the inverted data is written after the film is exposed from its least significant bit to its most significant bit, the inverted data being derived by the control means making 1's complement of the data when rewinding the film after exposure of the film.

3. The camera according to claim 1, wherein the data is magnetically written onto at least one of the plurality of magnetic recording tracks of the film.

4. A camera of a pre-wind type using a film cartridge capable of propelling a film having at least one recording track out of the cartridge by rotating a cartridge spool provided in the cartridge, the cartridge spool having a pair of end portions, each end portion of the cartridge spool including an elastic flange for nipping successive convolutions of the film rolled on the spool therebetween, comprising:

recording means for recording data on a predetermined portion of the film;

inverting means for inverting at least a portion of the data after the film is exposed; and control means for regulating the recording means so as to record the data onto the predetermined portion of the film in a first direction at a pre-winding of the film, and to record the inverted data data onto the predetermined portion of the film in a second direction opposite to the first direction at a rewinding of the film after exposure of the film.

5. The camera according to claim 4, wherein the data is written magnetically onto the film.

6. The camera according to claim 4, wherein the data is written optically onto the film.

7. The camera according to claim 4, wherein the predetermined portion for writing data in the first direction is a leader portion of the film.

8. The camera according to claim 4, wherein the predetermined portion for writing data in the second direction is provided on each frame of the film.

9. The camera according to claim 4, wherein the predetermined portion for writing data in the first direction and the predetermined portion for writing data in the second direction are both provided on each frame of the film.

10. A camera for using a film cartridge having a cartridge spool for coiling a film having at least a first information recording portion and a second information recording portion, the cartridge spool having a pair of end portions, each end portion of the cartridge spool including an elastic flange having annular lips, comprising:

means for fully winding the film to a take-up spool of the camera without causing exposure of the film;

means for rewinding the film into the cartridge after causing exposure of the film;

means for recording data onto the film, wherein the data includes predetermined writing data and photographic information, wherein the means for recording includes inverting means for inverting the photographic information after the film is exposed, wherein the means for recording data records the predetermined writing data onto the first information recording portion of the film during an initial winding of the film, and wherein the means for recording data records onto the second information recording portion of the film the inverted photographic information after completion of an initial winding; and control means for controlling the means for fully winding, the means for rewinding, and the means for recording.

11. The camera according to claim 10, wherein the predetermined writing data at the initial winding is pre-winding information.

12. The camera according to claim 10, wherein the first information recording portion of the film comprises a leader portion of the film.

13. The camera according to claim 10, wherein the first information recording portion comprises a plurality of subsections, each frame of the film including at least one of the plurality of subsections of the first information recording portion.

14. A camera capable of recording information using a film cartridge including a spool for coiling a film having a recording portion, the spool including a pair of end portions, each end portion of the spool including an elastic flange having annular lips for nipping successive convolutions of the film, the film being propelled out of the cartridge by rotating the spool in a predetermined direction, comprising:

> feeding means for winding the film fully when the cartridge is loaded into the camera, and for rewinding the film into the cartridge in response to finishing an exposure of the film;
>
> recording means for serially recording the information onto the recording portion of the film when the film is winding; and
>
> control means for controlling the feeding means and the recording means, wherein the recording means includes an inverting means for inverting a second set of information after the film is exposed, wherein the recording means records the information onto the film in a first recording direction during the winding of the film from the cartridge, and wherein the recording means records the inverted second set of information onto the film during the rewinding of the film into the cartridge.

15. The camera according to claim 14, wherein the recording means outputs the inverted second set of information serially from a least significant bit to a most significant bit when recording the inverted second set of information after finishing the exposure of the film.

16. The camera according to claim 14, wherein the recording means records the information in a leader portion of the film when winding the film initially.

17. The camera according to claim 14, wherein the recording means records the information in a trailer portion of the film when winding the film initially.

18. The camera according to claim 14, wherein the recording means records the information magnetically.

19. The camera according to claim 14, wherein the recording means records the information optically.

20. A camera of a pre-wind type using a film cartridge capable of propelling a film having a recording track out of the cartridge by rotating a cartridge spool provided in the cartridge, the cartridge spool having a pair of end portions, each end portion of the cartridge spool including an elastic flange for nipping successive convolutions of the film rolled on the spool therebetween, the camera comprising:

> a film feed mechanism which fully winds the film without exposure when the cartridge is loaded into the camera, and which rewinds the film one frame after shooting a frame of the film;
>
> a data processor which derives 1's complement of recording data; and
>
> a recording system which determines the recording track of the film and records the complemented recording data derived by the data processor serially onto the recording track of the film when the film is rewound into the cartridge.

21. The camera according to claim 20, wherein the data processor derives 1's complement of recording data by subtracting each digit data from 1.

* * * * *